(12) United States Patent
Carney et al.

(10) Patent No.: US 6,424,751 B2
(45) Date of Patent: *Jul. 23, 2002

(54) APPARATUS AND METHOD FOR EFFICIENT IMPLEMENTATION OF 2-DIMENSIONAL PIXEL WINDOW AVERAGING

(75) Inventors: Michael K. Carney; Ramesh Nagarajan, both of Fairport; Anthony M. Frumusa, Penfield; William A. Cook, Pittsford; Aron Nacman, Penfield, all of NY (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/159,533

(22) Filed: Sep. 23, 1998

(51) Int. Cl.[7] .................................................. G06K 9/38
(52) U.S. Cl. ......................... 382/272; 382/298; 358/451
(58) Field of Search ................................. 382/272, 298, 382/299, 300; 358/448, 451, 445

(56) References Cited

U.S. PATENT DOCUMENTS

| 5,008,752 A |   | 4/1991 | Van Nostrand |
| 5,237,432 A |   | 8/1993 | Calarco et al. |
| 5,418,626 A | * | 5/1995 | Semasa ..................... 358/451 |
| 5,790,714 A | * | 8/1998 | McNeil et al. ............. 358/451 |

* cited by examiner

Primary Examiner—Thomas D. Lee
(74) Attorney, Agent, or Firm—Fay, Sharpe, Fagan, Minnich & McKee, LLP

(57) ABSTRACT

A system and method for reducing an image by receiving a scaling factor which defines a window. Input pixel intensities of the image are summed in real time as they are input and stored until all pixels within the window have been received. The sum is then divided by the number of pixels within the window which produces an average intensity. A pixel having the average intensity is output.

11 Claims, 3 Drawing Sheets

FIG.2

APPARATUS AND METHOD FOR EFFICIENT IMPLEMENTATION OF 2-DIMENSIONAL PIXEL WINDOW AVERAGING

BACKGROUND OF THE INVENTION

1. Field of the Invention

The invention pertains to the art of image processing and, more particularly, to image reduction.

2. Description of Related Art

The following description includes references to slow-scan and fast-scan digital image data when discussing the orientation of selected window coordinates and sampled image data signals used by control circuitry. For purposes of clarification, data collected along a fast scan direction is intended to refer to individual pixels located in succession along a raster of image information. On the other hand, data collected in the slow-scan direction refers to data derived from a common raster position across multiple rasters of image information. As an example, fast-scan data would refer to the sequential signals collected along the length of the linear photosensitive array during a single exposure period, and is commonly referred to as a raster of data. Slow-scan data would be used to describe signals captured from a plurality of elements along a linear photosensitive array, as the array was moved relative to a document. Analogously, your eyes move in the fast-scan direction relative to this page as you read along each line; when your eyes move to the next line down, they have moved in the slow-scan direction.

Various digital image processing techniques are known for manipulating static images which are later output onto such media as the screen of a personal computer or onto printed paper. One of these processes is reducing the size of an image. Van Nostrand, in U.S. Pat. No. 5,008,752, discloses a method to reduce an image by providing interpolated data in two dimensions. The process includes row and column interpolators operating to generate signals indicating when the next element, row or pixel is to be retrieved. The interpolators also produce a displacement address, which is used to retrieve an interpolation coefficient from a look-up table, the interpolation coefficient being used subsequently to produce the interpolated output. Unfortunately, the look-up tables require extensive use of costly memory devices.

Another method is disclosed by Calarco et al. in U.S. Pat. No. 5,237,432 to obtain two successive input pixel values, $P_n$ and $P_{n+1}$. At the same general time, an arithmetic accumulation of the sum of a seed value, a previously accumulated sum, and a supplemental value is calculated. Typically, this accumulated sum has both integer and fractional portions. Once determined, the integer portion of the accumulated sum is used to determine whether the first and second input pixel values are to be used to produce an output pixel value. If so, the accumulated sum is used to generate a scale or interpolation factor, $\alpha$, based upon the fractional portion of the accumulated sum, which, in turn is used to interpolate between the first and the second pixel values to produce an output pixel value where: $P_{new}=P_{n+1}+\alpha(P_n-P_{n+1})$. The process is continued until all input pixels have been processed.

However, the integer portion of this process eliminates pixels according to a sequence that corresponds to the desired scaling. For example, if an image is to be reduced by 50%, every other pixel is discarded, if the desired reduction is 33%, every third pixel is discarded. In fact, regardless of the scale factor desired, an output pixel created from the linear interpolation technique of Calarco et al., will only take into account the four nearest neighbor pixels. Thus, the output image can have uneven shading and other image degradations.

The present invention contemplates a new, efficient reduction technique, which overcomes the above-referenced problems and others and provides a more accurate implementation of pixel window averaging.

BRIEF SUMMARY OF THE INVENTION

In accordance with the present invention, there is provided an image processing system for reducing an image by a desired scaling factor. The image comprises a plurality of video signals each having a magnitude, so that the system can represent the image with a number of output video signals. The system includes averaging means for determining an average magnitude associated with a defined set of input video signals where the set is defined by the scaling factor. Video signal output means are also provided for outputting the output video signal comprising the average magnitude.

In accordance with another aspect of the present invention, the scaling factor includes a fast scan component which is inversely proportional to a fast-scan seed factor and a slow scan component which is inversely proportional to a slow-scan seed factor.

In accordance with another aspect of the present invention, the defined set of input video signals includes a number of whole and partial input video signals in both the slow scan direction and in the fast scan direction.

In accordance with another aspect of the present invention, the averaging means is an electrical circuit including an adder for summing a plurality of the video signal magnitudes. The adder also provides a partial sum of the magnitudes which is temporarily stored in a memory device.

In accordance with another aspect of the present invention, a multiplier is provided for producing the average magnitude by determining the product of a total sum of the magnitudes in the set multiplied by the inverse of a product of the fast scan seed factor and the slow scan seed factor.

In accordance with another aspect of the present invention, a number of memory locations are determined for the memory device by comparing a leading edge of the input video image with the fast scan seed factor.

In accordance with another aspect of the present invention, the output video signal having the average magnitude of the set is output in real time.

In accordance with another embodiment of the present invention, a method is disclosed for reducing an image in accordance with a scaling factor. The scaling factor is received defining a set of input video signals. The magnitudes of the set of are summed together and averaged. An output video signal having the average magnitude is output for each set.

In accordance with another aspect of the present invention, for a number of slow scan lines corresponding to a seed factor in a slow scan axis, the summing includes summing the magnitude of a number of fast scan input signals corresponding to a seed factor in a fast scan axis.

The result from the summing step is temporarily stored until a total magnitude of the input video signals within a set is summed.

In accordance with another embodiment of the present invention, an imaging device capable of scanning an image thus producing a stream of input video signals eligible for reduction in accordance with a scaling factor is provided.

The imaging device includes means for determining an average magnitude of a set of the input video signals where the set is determined by the scaling factor.

One benefit obtained by use of the present invention is that the reduced output image will more faithfully represent the input image.

Another benefit obtained from the present invention is real-time processing.

Yet another benefit obtained from the present invention is reduced memory requirements.

Other benefits and advantages of the subject new method and apparatus will become apparent to those skilled in the art upon a reading and understanding of this specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings which form a part hereof and wherein:

FIG. 2 an illustration of the method over a sample input pixel set; and

DETAILED DESCRIPTION OF THE INVENTION

Figure 1:
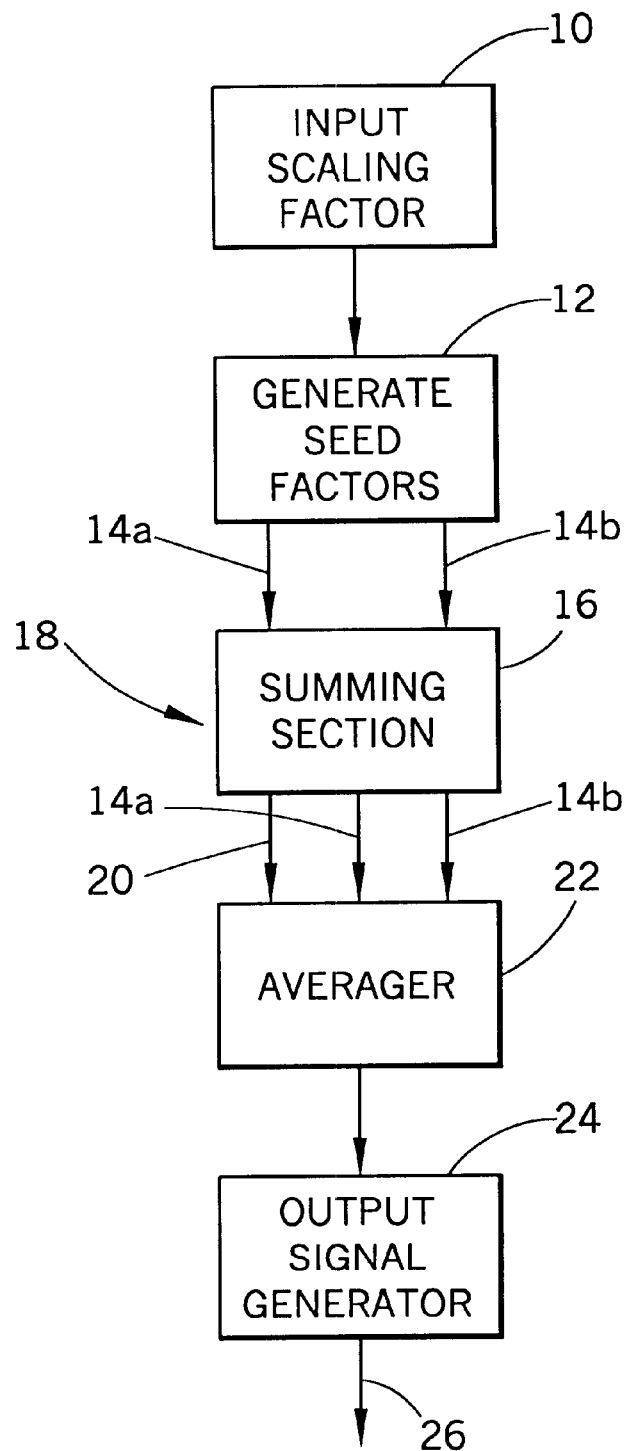
FIG. 1 is a flow-chart of the method in accordance with the present invention.

Turning now to the drawings, wherein the showings are for purposes of illustrating the preferred embodiments of the invention, and not for purposes of limiting same, FIG. 1 shows a flow chart of the method of the invention. A scaling factor 10 is set for reducing an input image. The scaling factor is input into the seed factor generator 12. The scaling factor 10 is the desired reduction percentage of the input image, and may be one number indicating the operator desired overall reduction (e.g. reduce the entire image uniformly by 50%), or individual axis reductions (e.g. reduce 27% along the fast scan axis and 43% along the slow scan axis). In seed factor generator 12, the seed factors (also referred to herein as 'window dimensions') are determined. The 'window' is a useful analogy to define a set of adjacent input video signals or pixels. The set or 'window' is defined by the seed factors which in turn are derived from the scaling factor. Seed factors comprise the number of input signals to be averaged in the fast-scan and slow-scan directions. In the presently preferred embodiment, the seed factors are determined by taking the reciprocal of the scale factor along each dimension line. In equation form:

$$\text{seed\_factor}_{fast\text{-}scan} = (\text{scale\_factor}_{fast\text{-}scan})^{-1},$$

and $$\text{seed\_factor}_{slow\text{-}scan} = (\text{scale\_factor}_{slow\text{-}scan})^{-1}.$$

Again, the seed factors can be imagined as a defining a window, sized by the number of input signals (or pixels) in both the fast and slow scan directions. Importantly, the window size is not required to be a whole number. That is, the window size also includes any fractional part of an input signal. Out of seed factor generator 12 the seed_factor$_{fast\text{-}scan}$ (or window dimension$_{fast\text{-}scan}$) 14a and seed_factor$_{slow\text{-}scan}$ (or window dimension$_{slow\text{-}scan}$) 14b are sent to the summing section 16.

An operator will initiate the stream of pixels by powering a scanner, copier, software application, or other device capable of providing input signal data in successive fast scan rasters. The input video signals 18, each defining a magnitude, proceed into the summing section 16. Summing section 16 uses the seed factors 14 to define the edges of the 'windows.' This allows for the calculation of a total magnitude of the input signals within each window. Once the total magnitude of the set of input signals defined by the seed values is obtained, the sum 20 moves into the averager 22 to be divided by the number of input signals to produce an average magnitude. It is to be appreciated that the number of input signals within a set or window is equivalent to the product of the seed factor in the fast scan direction 14a multiplied by the seed factor in the slow scan direction 14b. Output device 24 produces and outputs an output signal 26 having the average intensity.

Figure 2:
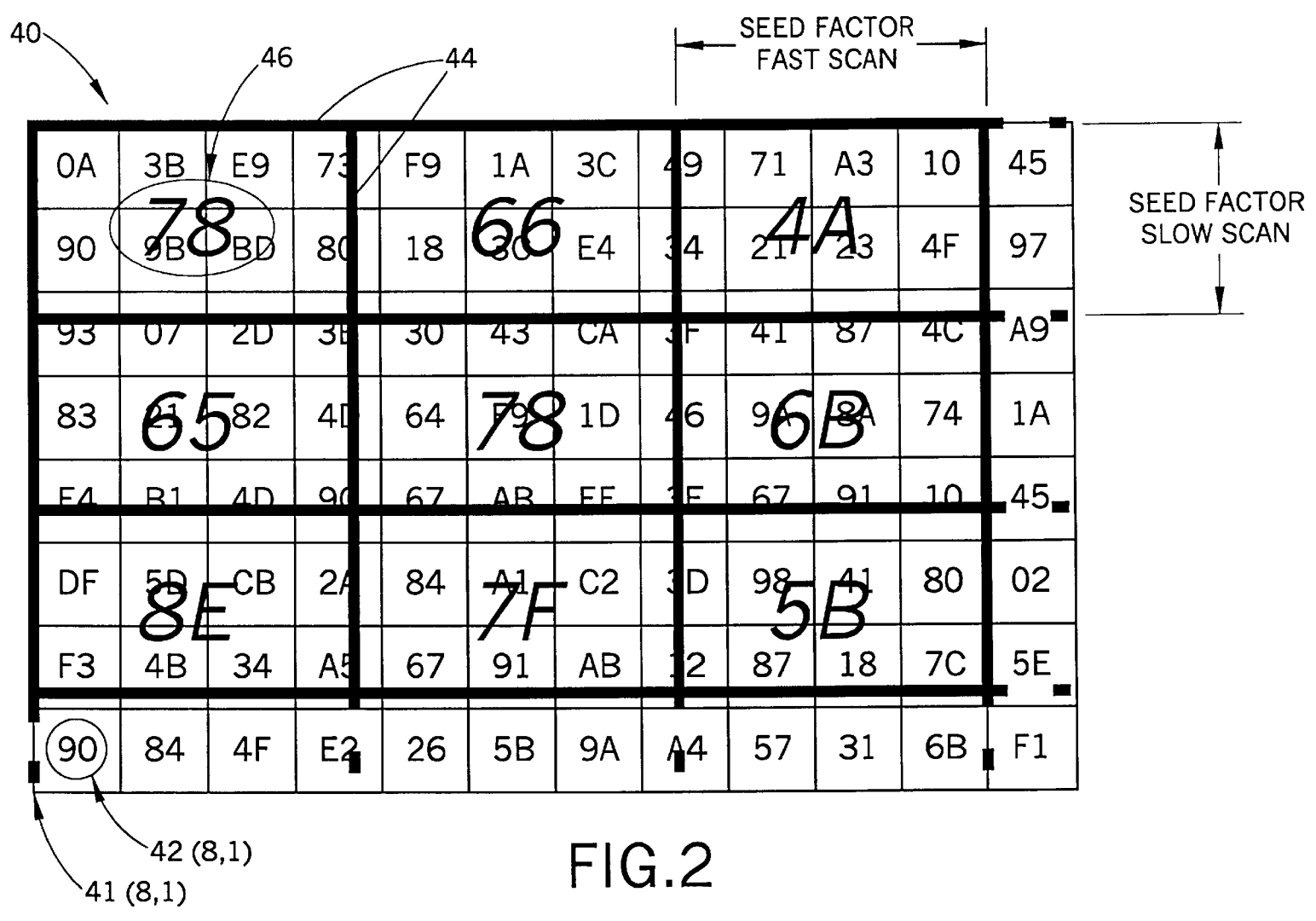

Referring to FIG. 2 a sample 12×8 video signal input array 40 is shown with each signal being designated as 40(row,column). For example, the signal in the lower left corner is 40(8,1). Each signal contains a hexadecimal intensity or magnitude value 42. Thus, the magnitude of the same example signal, 40(8,1), is 90h (where 'h' indicates the numeral is in hexadecimal). The scale factor is typically provided by an operator, and for illustration purposes, an operator is assumed to have provided a scale factor of 27% in the fast scan direction and 43% in the slow scan direction. Thus the respective seed factors are:

$$\text{seed\_factor}_{fast\text{-}scan} = (\text{scale\_factor}_{fast\text{-}scan})^{-1}$$

$$\text{seed\_factor}_{fast\text{-}scan} = (0.27)^{-1}$$

$$\text{seed\_factor}_{fast\text{-}scan} = 3.7;$$

and $$\text{seed\_factor}_{slow\text{-}scan} = (\text{scale\_factor}_{slow\text{-}scan})^{-1}$$

$$\text{seed\_factor}_{slow\text{-}scan} = (0.43)^{-1}$$

$$\text{seed\_factor}_{slow\text{-}scan} = 2.3.$$

Applying these seed factors according to the window analogy discussed above yields window 44. The intensities of the pixels or video inputs 40, including any fractional portion, in the window 44 are totaled and averaged. The output pixel (analogous to window 44) is assigned the average value that is graphically illustrated as 46 i.e. 78h.

Figure 3:
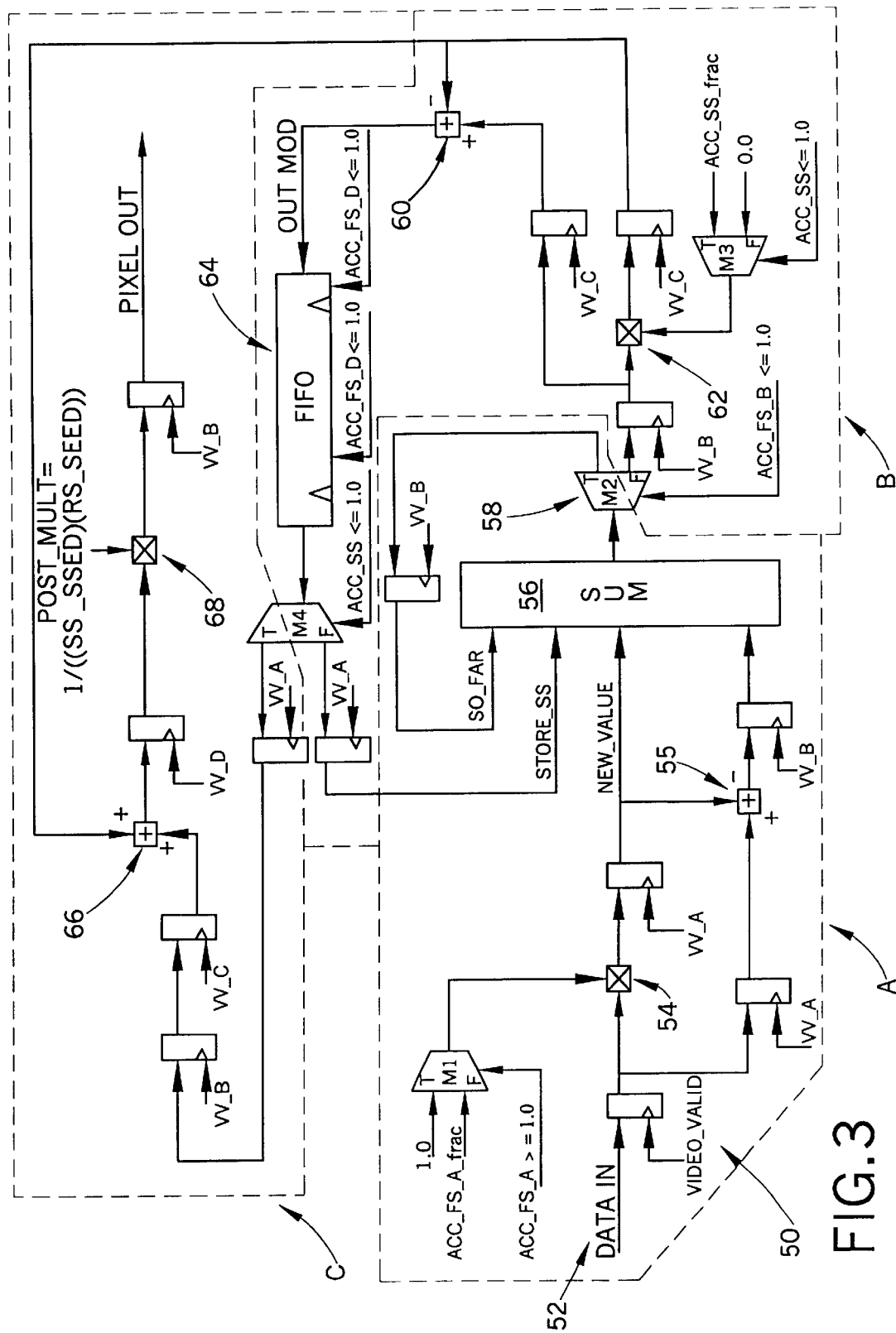
FIG. 3 is a diagram of an electrical circuit configured to practice the present invention.

Now referring to FIG. 3, a circuit 50 suitable for practicing the invention can best be envisioned as comprising three main parts, namely a fast scan pixel summer section 'A,' a slow scan pixel memory section 'B' and an averaging/output section 'C.'

Starting in section A and tracing the hypothetical values from FIG. 2, an intensity datum arrives at the reducing circuit at the data input 52, and proceeds to a multiplier 54. Also arriving at the multiplier 54 is a value representing the percentage of the pixel inside the right edge of the window. In the case of the first pixel 40(1,1) in FIG. 2, this value is 0Ah (0Ah multiplied by 1.0). Next, the result proceeds to the adder 56. Since no other inputs are yet present, nothing is added and the value proceeds to a decision device 58.

The decision device 58 determines if the pixel is on a window edge. If the pixel is not on a window edge, the decision device 58 feeds back the value into the adder 56 (the condition if the pixel is on a window edge will be discussed below). The fed back value is added to the next pixel intensity datum—3Bh still using the hypothetical values from FIG. 2. Again, since the second pixel is also not on a window edge, the value feeds back into the adder 56, and is added to the next pixel, E9h.

The next datum, 73h is on a window edge, so it must be handled differently. It arrives conventionally, at the data input 52, and proceeds to the multiplier 54. However the other value arriving at the multiplier 54, is a value representing the percentage of the pixel inside the side edge of the window (70% in this case). Recall that our example seed_$factor_{fast-scan}$ is 3.7. The window edge is detected by decrementing the whole number component by one for each input signal. So, by the time the present datum, 73h, is input, only the percentage portion (i.e. 0.7) remains. Thus the value reaching the adder 56 is 50h (73 hex=115 dec; 0.7×115= 80.5dec; 80.5 dec=50h). The other value going into the adder 56 (on the 'so_far' line) is the sum of the previous three input signals or 12Eh. Therefore, the sum out of adder 56 is 12Eh+50h or 17Eh.

Since an edge was encountered (seed_$factor_{fast-scan}$<1), the decision device 58 directs the result into section B of the circuit 50. Nevertheless, before leaving section A, recall that the last whole cell (whose intensity was 73h from FIG. 2) was not accounted for in the first window. Properly only the portion in the window (50h) was included in the value for the first window. The remaining 23h becomes the first part of the second window. This is evident by recalling that as the magnitude datum arrives at the data input 52, one lead proceeds to the multiplier 54 and another proceeds to an adder 55. One component into the adder 55 is the whole intensity value (73h) while the other is the portion contained in the first window (50h). The adder 55 negatively sums these two and the difference, 23h, going to adder 56 is delayed to arrive coincident with the next whole pixel magnitude (F9h).

Now following the previous result into section B at the decision device 58, the result is split and passed to an adder 60 and a multiplier 62. In addition, at the multiplier 62 is a factor representing how much of the pixels are beyond a bottom edge of a window. Since all the cells are within the window the result is zero. This result is added negatively to (i.e. subtracted from) the whole row at adder 60. Coming out of adder 60 then is the sum of all the intensities on the first row of pixels within the first window, 17Eh. This value is stored in FIFO 64.

The FIFO 64 is programmed by scanning the leading edge of the document to establish memory locations for one row, or raster of fast scan seed factors. Thus in our example, the FIFO 64 has three memory locations available for this set of sample data. Further, the value of the sum of the first set of sample data, 17Eh, occupies the first of these three memories. The other two memories are filled in the same way as the first. Scanned intensity or magnitude values are summed in section A and then stored in section B when the scanner reaches a side edge.

When the scan begins on the second row of pixels, the process continues substantially as above, with one exception. Section A works as before but when a side edge is detected the FIFO 64 outputs the value in its first memory slot to the adder 56. Said another way, when an edge is encountered, the oldest item in the FIFO 64 is output and routed to the adder 56 to arrive coincident with the fractional cell value. In our example, recall the value of the first row of cells in the first window was 17Eh. Also, recall it was the first value in the adder, so it will be the first value out. Thus, when the fractional part of the next edge cell (with intensity 80h in our example) arrives at the adder 56 on the 'new_value' line, 17Eh will arrive on the 'store_ss' line, and the sum of the first three pixels 1E8h (90h+9Bh+BDh) will arrive on the 'so_far' line. The result is 59h+17Eh+1E8h=3BFh.

Still referring to FIG. 3, a window bottom edge lies over the next row of cells (the row starting at 40(3,1) having intensity 93h). At the moment this row starts to scan, the FIFO 64 is loaded with three sets of sums corresponding to the summed magnitude values of the first two rows for each of the three sets or windows. Section A works conventionally except that now, because a bottom edge is detected, the FIFO 64 output does not return to the adder 56 when the side edge is reached. Instead, the FIFO 64 output proceeds to section C to be output. This will be discussed more below. Thus, in our example, only the sum of the third row of cells inside the side edge is sent to the decision device 58. As before, the result is split and passed to the adder 60 and the multiplier 62. However, this time the multiplier 62 contains a fraction representing the percentage of the pixels inside the window (by decrementing seed_$factor_{slow-scan}$). This value is subtracted from the row total in the adder 60, which saves the portion of the cells outside the first window into the FIFO 64, while the portion inside the first window proceeds to section C. It should now be apparent that the total sum of the intensities within the present window has been obtained. Additionally, the portion of the raster outside the present window is saved in the FIFO 64 and will be added to the corresponding set in the next row down in the conventional manner, i.e. when the next side edge is encountered.

The following paragraph illustrates the bottom edge procedure discussed above using numbers from FIG. 2. Starting in section A, an intensity datum 93h arrives at the reducing circuit at the data input 52, and proceeds to the multiplier 54. Also arriving at the multiplier 54 is a value representing the percentage of the pixel inside the right edge of the window or 1.0 in this case. Thus 93h proceeds to the adder 56, and since no other inputs are yet present, nothing is added and the value proceeds to the decision device 58. The decision device 58 determines that the pixel is not on a side window edge, and feeds back the value, 93h, into the adder 56. There the value is added to the next pixel intensity datum, 07h. Again, since the second pixel is also not on a window edge, the value feeds back into the adder 56, and is added to the next pixel, 2Dh. The next datum, 3Bh (on a side window edge, in other words seed_$value_{fast-scan}$<1) arrives at the data input 52, and proceeds to the multiplier 54. However also arriving at the multiplier 54 is a value representing the percentage of the pixel inside the side edge of the window (still 70%, i.e. the decimal portion of seed_$value_{fast-scan}$). Thus, after the multiplier 54 the value reaching the adder 56 is 29h (3Bhex=59 dec; (0.7)(59)=41.3 dec; 41.3 dec=29h). The other line going into the adder 56 (on the 'so_far' line) is now zero because of decision device 70 which will be discussed more infra. Therefore, the value F0h (93h+07h+2Dh+29h) proceeds from the adder 56 to the decision device 58. This value is split and passed to the adder 60 and the multiplier 62. Also, at the multiplier 62 is a percentage representing how much of the pixels are within the bottom edge of the window or 30% in our example (the decimal portion of seed_$value_{slow-scan}$). After the multiplier 62, the value 48h (output of adder 56=F0hex=240 dec; (0.3) (240)= 72 dec; 72 dec=48hex) proceeds to the adder 60 and into section C. This is the magnitude of the pixels within the present set. At the adder 60 48h is subtracted from the row total which was F0h. F0h−48h=A8h. This, A8h, is the intensity of pixels belonging to the next window in the slow scan direction, designated by reference numeral 45 in FIG.

2. It is stored in FIFO 64 and will be added when the side edge is reached on the next scan line. In other words, when pixel 40(4,4) with intensity 4Dh arrives at the adder 56.

The last portion of FIG. 3 is average/output section C. Recall from above when the last row within a window is scanned the cumulative pixel sum of that window is directed to section C, not back into the adder 56, when the side edge is encountered. Further, recall the value out of the FIFO 64 for our example was 3BFh which proceeds to an adder 66. Also into the adder 66 is the portion of the bottom cells inside the window from section B. This value was 48h. Thus, out of the adder 66 the result 407h proceeds to the multiplier 68. The inverse of the product of the two seed values also enters the multiplier 68 (1/(SS_SEED*FS_SEED)=1/(2.3*3.7)=0.117508813 which is rounded by a 9-bit representation of decimal places in the preferred embodiment to 0.1171875). This result acts to divide the sum of the pixel intensities by the number of pixels (407h*0.1171875=1031d*0.1171875=120d=78h). This, of course, represents the average pixel magnitude, which is then output.

The invention has been described with reference to the preferred embodiments. Potential modifications and alterations will occur to others upon a reading and understanding of the specification. For example, this reduction technique can be used to scale an image by 100% essentially allowing a "pass-thru" mode without requiring a separate module to reproduce non-scaled images. It is our intention to include all such modifications and alterations insofar as they come within the scope of the appended claims, or the equivalents thereof.

Having thus described our invention, we now claim:

1. An image processing system for reducing an image by a desired scaling factor, said image comprising a plurality of video signals each having a magnitude, the system including:

an input which receives a stream of the video signals;

a seed factor generator which calculates a fast scan seed factor from the scaling factor and a slow scan seed factor from the scaling factor;

averaging means for determining an average magnitude associated with a set of input video signals, said set being defined by the fast scan seed factor and the slow scan seed factor, said averaging means including a fast scan adder which sums together at least a portion of the magnitudes of each video signal in the set along a fast scan direction to generate partial sums in the fast scan direction, wherein the partial sums are stored in a memory and provided alternately to the adder for incorporation into a subsequent sum corresponding to the same set or output means based on the slow scan seed factor; and output means for outputting an output video signal comprising the average magnitudes of each set.

2. A method of scaling an image, said method comprising:
(a) obtaining a scaling factor representative of an amount of scaling to be performed on the image;
(b) calculating a fast scan seed factor and a slow scan seed factor from the scaling factor;
(c) reading a stream of pixels corresponding to the image, each pixel having a pixel value, said reading progressing such that successively scan lines of pixels are read in a fast scan direction and between each scan line the reading advances in a slow scan direction;
(d) summing at least a portion of the pixel values of each read pixel, said summing being carried out such that each read pixel is acted upon before its corresponding following pixel is read, said summing generating running totals of pixel values across spans of pixels in the fast scan direction, said spans of pixels being determined by the fast scan seed factor;
(e) storing the running totals;
(f) adding the stored running totals into at least a portion of corresponding running totals from the subsequent scan line obtained along the same span in the fast scan direction;
(g) repeating steps (d) and (f) over a span of scan lines, said span of scan lines being determined by the slow scan seed factor;
(h) dividing the running totals by the product of the fast and slow scan seed factors; and,
(i) outputting the results of step (h).

3. The method according to claim 2, wherein the fast scan seed factor is the inverse of the component of the scaling factor in the fast scan direction, and the slow scan seed factor is the inverse of the component of the scaling factor in the slow scan direction.

4. The method according to claim 2, wherein the running totals are stored in a FIFO storage device.

5. The method according to claim 2, wherein the pixel values represent an intensity of their respective pixels.

6. The method according to claim 2, said method being implemented in one of an electric circuit, a computer readable code executable by a computing device or a combination of both.

7. An image processor for scaling an input image comprising a plurality of pixels arranged such that scan lines of pixels are oriented along a fast scan direction and the scan lines are arranged next to one another along a slow scan direction, said image processor comprising:

scale selection means for obtaining a scaling factor, said scaling factor representing an amount of scaling to be carried out on the input image;

calculating means for calculating a fast scan seed factor and a slow scan seed factor from the scaling factor;

an input for reading a stream of the pixels corresponding to the input image, each pixel having a pixel value, said reading progressing such that successively the scan lines of pixels are read in the fast scan direction and between each scan line the reading advances in the slow scan direction;

an adder for summing at least a portion of the pixel values of each read pixel, said summing being carried out such that each read pixel is provided to the adder before its corresponding subsequent pixel is read by the input, said summing generating running totals of pixel values across spans of pixels in the fast scan direction, said spans of pixels being determined by the fast scan seed factor;

a storage device for storing the running totals;

feedback means for routing running totals from the storage device back to the adder thereby adding the stored running totals into at least a portion of corresponding running totals from the subsequent scan line obtained along the same span in the fast scan direction, said feedback means routing back the running totals over a span of scan lines, said span of scan lines being determined by the slow scan seed factor;

a divider which divides the running totals by the product of the fast and slow scan seed factors; and, an output which outputs results obtained from the divider.

8. The image processor of claim 7, wherein the calculating means calculates the fast scan seed factor by taking the inverse of the component of the scaling factor in the fast scan direction and the slow scan seed factor by taking the inverse of the component of the scaling factor in the slow scan direction.

9. The image processor of claim 7, wherein the storage device is a FIFO storage device.

10. The image processor of claim 7, wherein the said image processor is incorporated in a xerographic device.

11. The image processor of claim 7, said image processor being implemented in one of an electric circuit, a computer readable code executable by a computing device or a combination of both.

* * * * *